(12) United States Patent  
Peyton (10) Patent No.: US 6,848,860 B2  
(45) Date of Patent: Feb. 1, 2005

(54) MAINTENANCE APPARATUSES FOR PERMEABILITY IMPROVEMENT IN FLUID CONTAINMENT BASINS

(76) Inventor: Dennis E. Peyton, 11423 E. McKinley Ave., Sanger, CA (US) 93657

( * ) Notice: Subject to any disclaimer, the term of this patent is extended or adjusted under 35 U.S.C. 154(b) by 0 days.

(21) Appl. No.: 10/654,842

(22) Filed: Sep. 3, 2003

(65) Prior Publication Data

US 2004/0060849 A1 Apr. 1, 2004

Related U.S. Application Data

(63) Continuation-in-part of application No. 10/083,272, filed on Feb. 23, 2002, now Pat. No. 6,709,199.

(51) Int. Cl.[7] .............................. E02F 9/08; E02F 5/28
(52) U.S. Cl. ............................ 405/53; 37/342; 37/343; 37/344; 37/345; 405/258.1; 405/303
(58) Field of Search .......................... 37/337, 342–345; 405/258.1, 303, 52, 53

(56) References Cited

U.S. PATENT DOCUMENTS 3,885,331 A * 5/1975 Mathieu ...................... 37/344
5,406,725 A * 4/1995 Breese ........................ 37/342
5,412,884 A * 5/1995 Staples et al. ............... 37/342

* cited by examiner

Primary Examiner—Thomas B. Will  
Assistant Examiner—Tara L. Mayo  
(74) Attorney, Agent, or Firm—Richard A. Ryan (57) ABSTRACT

The apparatuses for improving the permeability of a fluid containment basin having a plurality of ridges and furrows in the bottom of the basin are configured to disturb sediment that has settled on the ridges so as to place the sediment back into suspension. In one configuration, the apparatus comprises a tool support frame adapted to support one or more ridge cleaning tools on top of the ridges. The tools include dragging, discing and grinding tools. The discing tool is configured with a flexible axle to allow the tool to move in response to changes in the contour of the ridge. In another configuration, a boat or other device is moved across the basin above the ridges to cause wave energy from the boat's propellor to disturb the sediment on the ridges. The tool support frame with one or more ridge cleaning tools can be pulled behind the boat.

38 Claims, 9 Drawing Sheets

MAINTENANCE APPARATUSES FOR PERMEABILITY IMPROVEMENT IN FLUID CONTAINMENT BASINS

CROSS-REFERENCE TO RELATED APPLICATIONS

This application is a continuation-in-part of U.S. patent application Ser. No. 10/083,272 filed Feb. 23, 2002, now patented as U.S. Pat. No. 6,709,199, which issued on Mar. 23, 2004.

BACKGROUND OF THE INVENTION

A. Field of the Invention

The field of the present invention relates generally to systems for controlling sediment in earthen basins, such as groundwater recharge, treated wastewater disposal and flood control basins. More specifically, the present invention relates to apparatuses for maintaining or improving the permeability in fluid containment basins or systems that utilize multiple sloped ridges in the basin bottom through which fluid is desired to continually percolate. Even more specifically, the present invention relates to such apparatuses that are configured to maintain or improve the permeability of such basins without requiring fluid flow to the basins to be periodically and substantially reduced or stopped.

B. Background Art

Earthen basins are commonly used to contain water for several purposes including, but not limited to, groundwater recharge of surface water, flood control and containment of municipal, industrial and agricultural waste waters. The function of these basins often rely on, or are enhanced by, the percolation of the contained water through the bottom and sides of the basin. The percolation rate of the basin is primarily controlled by the underlying soil conditions and material and by the amount and type of sediment which has settled on the surface of the basin bottom. The sediment usually becomes the controlling element, often clogging a basin so that pumping the water or fluid from the basin becomes the only economical means of draining the basin for maintenance. The subsequent removal or mixing of this clogging sediment requires the use of light and/or heavy equipment after the basin has adequately dried. Unfortunately, the equipment typically used for basin maintenance can compact the surface material, thereby requiring additional efforts to uncompact the material and return the basin to its maximum infiltration performance levels. The challenge for fluid containment basin designers and operators has been to develop a low maintenance facility without compromising percolation effectiveness.

It is well known that basin percolation is at or near the maximum rate for the first several months of operation after initial basin construction or after maintenance of an existing basin because the surface of the basin has not had time to become clogged by sediment materials. The surface clogging sediment results from several of fines, including single cell and filamentous algae, silts and clays in the irrigation/recharge water and generated by interbasin erosion (filling and levy erosion). Over time the percolation ability of the decreases as the sediment forms a virtually impenetrable clogging layer. The infiltration clogging effect of the sediment is a serious concern for all industries, business and agencies using percolation basins. Accumulated sediments limit the percolation of water through a basin and, without routine mechanical maintenance, the clogging effect will eventually render a basin's percolation ability virtually useless. As set forth in more detail in U.S. Pat. No. 6,709,199 (the full content of which is incorporated into this text as though fully set forth herein), basin owners and operators have historically used discing, ripping, scraping and combinations thereof to control and/or remove the clogging sediment layer with varying degrees of success. If the sediment was composed of inorganic material, discing or shallow mixing is often ineffective because the near surface becomes clogged with the accumulated fine-grained material. If the sediment included sufficient organic material, discing or shallow mixing without routine deep drying cycles is ineffective because the near surface becomes clogged with anaerobic microbes. Scraping and subsequent ripping can be effective, but it is costly and is typically required at least every three years.

Sediments are inorganic and/or organic particles which settle on the surface of the basin during the filling and operation of the basin. The sediments are generated and accumulated via several mechanisms including: (1) release of silt and clay from the native basin material into suspension by turbulence from the filling water in a freshly maintained or newly constructed basin; (2) wave action on the basin's perimeter side slopes; (3) settling of the suspended silt and clay contained in the influent water; and (4) settling of suspended organic materials (i.e., algae and weeds) that grow in the basin. Clays and silt-clays (fines) are deposited as a thin layer on the bottom of the basin. A layer of these fines as thin as one-eighth inch has about as much resistance to infiltration as two feet of silty sands, forty feet of sugar sands and two thousand feet of clean gravel. Over time, organics may also settle to the bottom of the basin. These settled organics also affect the infiltration ability of the basin.

The common methods of maintaining a basin and controlling the clogging effect are expensive and time consuming. All these methods first require the basin be drained and then dried. After drying, heavy equipment is normally used to access and work in the basin's bottom. The draining process sometimes requires pumping the water from the basin when the basin's bottom is significantly clogged that water will not empty by percolation. Pumping is also used when the basin's bottom is only somewhat clogged, but time is of the essence. The "Dry and Crack" Method (also referred to as the "Chip" Method) is accomplished by allowing the basin bottom to dry and crack to form "chips" with small spaces between the chips. Although the permeability of the basin is initially substantially improved, the chips soon resettle and the small spaces are soon filled with sediment and the basin becomes clogged, requiring the basin to be re-dried, sometimes as often as twice a month. The "Shallow Mix" Method requires the basin bottom be dried longer and deeper to allow mechanical equipment, such as a tractor, to drive on the bottom and use a tool, such as a disc, spring tooth, plow or other shallow mixing device, to break-up and mix the chips with the upper surface material to disperse the thin layer of clogging sediment into the upper surface material. Although this process is more effective at temporarily improving permeability, over time the mixed layer becomes increasingly impermeable and must eventually be removed with heavy equipment, such as a paddle wheel scraper. The use of heavy wheeled equipment compacts the upper portion of the basin's bottom, which is so detrimental to percolation that it is often necessary to utilize another piece of heavy equipment, for instance a tracklayer (bulldozer) with ripping shanks, to decompact or loosen the compacted upper layer. A third method, the "Deep Mixing" Method, requires the basin bottom be dried to a moisture content that allows heavy equipment, such as a tracklayer, to drive on the bottom and use a ripping shank, perhaps combined with a slip plow, or other deep mixing device. Although also effective at temporarily improving the permeability of the basin, the deeply mixed layer will likely begin to support an active anaerobic condition that, over time, will become the clogging layer and limit the percolation rate. In addition, as with the Shallow Mixing Method, the use of heavy wheeled scraping equipment compacts the upper portion of the scraped basin bottom. The cost of routine mixing and the eventual removal of large quantities of material makes the Deep Mixing Method a very expensive means of maintaining a water containment basin and creates long term constraints.

Growing concerns regarding contaminants (i.e., regulated chemicals and substances) leaching into the groundwater from percolation basins has resulted in new regulations regarding the control of erosion at construction sites where surface drainage waters flow into the basins. As is well known, eroded sediments will often adsorb or bond to common contaminants and then carry those contaminants into the containment basin. In general, the Chip, Shallow Mixing and Deep Mixing methods of basin maintenance are poor methods of contaminant control because the contaminants remain in the bottom of the basin where percolation is taking place. In fact, these three methods are somewhat in conflict with contaminant control goals because the contaminants can be easily leached, with the percolating water into the unsaturated or vadose zone, then possibly into the groundwater. When contaminant control is also required of a basin, basin maintenance becomes increasingly important and more expensive. The frequently required basin draining, drying, removal of sediments and contaminants followed by the efforts to decompact the soil require significant downtime, staff and equipment. In addition, there are concerns with air dispersal of sediments and contaminants during the basin maintenance process by the creation of dust and dust particles. The conflict of percolation effectiveness versus contaminant management usually results in basins having less effective percolation characteristics and utilizing basin maintenance methods that maintain those characteristics. Concerns regarding sediment as a basin contaminant have recently required building contractors to employ expensive on-the-jobsite sediment and other contaminant containment practices and equipment.

One such method that is used for management of contaminants is the "Minimum Scraping" Method. This method is employed when the object of the maintenance is to remove the sediment with the minimum amount of excess (i.e., disposal) material, such as when the sediment is considered to contain contaminants that could accumulate over time and become hazardous waste or result in groundwater contamination. To maintain the basin, the basin bottom is dried sufficiently to allow equipment, such as a motor grader, to drive on the bottom and windrow the thin layer of sediment into ridges. The windrowed sediments are wetted (to limit air dispersal) then scraped up by a loader into a dump truck, or similar equipment, for removal. Unfortunately, depending on soil composition and compaction from the equipment, the basin bottom can become compacted quickly, resulting in ever decreasing percolation rates between cleanings, usually resulting in the basin having to be drained by pumping rather than by percolation, which limits the use of this method due to the availability and cost of operating pumping and heavy equipment.

As set forth in U.S. Pat. No. 6,709,199, the present inventor developed a sediment control system for fluid containment basins that reduces or substantially eliminates the need to completely drain fluid from the basin and th use of heavy equipment over the permeable zones of the basin. In one embodiment of that invention, the sediment control system comprises a fluid containment basin having a plurality of basin embankments enclosing a basin bottom with a plurality of ridges and furrows on the basin bottom. Each of the ridges has at least two sides, generally formed at sloped angles, and an upper area at the top of the ridge. The furrows are located adjacent and substantially parallel to the ridges such that a furrow is disposed between and bounded by a pair of ridges. The ridges are shaped and configured, such as an inverted "V" shape, to facilitate the settlement of sediment contained in the fluid into th one or more furrows. In use, the flow of fluid into the basin is reduced on a periodic basis so that wave action washes sediment off of the upper area and sides of the ridges as the water level is lowered. Although the use of wind to generate the waves is preferred, the basin can comprise a mechanism for generating the waves. After washing of the ridges, the basin is re-filled with fluid. A substantially impermeable mat of sediment can be allowed to form in the furrows to prevent migration of contaminants contained in the fluid out of the basin. With the contaminants contained in the furrows, they can be treated or, if sufficient time is available, allowed to deteriorate into harmless or less harmful components.

Although the use of ridges and furrows in basins combined with the wave washing method of cleaning such basins has been demonstrated to work very well, some fluid containment basins are operated or otherwise constrained so as to prevent routine water level decreases and/or to decrease the effect of natural wave washing. When basins are not routinely dewatered to allow natural wind driven wave action to migrate the sediment from the ridge areas to the furrow areas, sediment clogging of the ridges will eventually occur. The operational and/or constrained conditions may include one, or a combination of, and are not limited to, the following:

(1) A basin might be relatively deep and its sides relatively steep and/or the basin relatively small so that the effect of wind driven waves on exposed ridges is diminished by virtue of the decreased velocity of the wind near the basin bottom. The sides of the relatively deep basin create a "wind shadow" that can effectively dampen the wind velocity and/or create what sailors call "dirty air". In this condition, the bottom of the basin nearest to the incoming wind direction is likely to be in the wind shadow and receive minimal wind washing effects. The bottom of the basin furthest from the incoming wind direction is much less likely to be affected by the wind shadow and therefore will likely receive effective wind washing when the ridges are exposed during declining water levels.

(2) A basin can be configured such as an intentional recreational lake, such as for boating and/or fishing, where maintaining a high water level is desired and decreasing the water level to perform routine wave washing of the ridges is undesirable. In this condition the sediment accumulates on the ridge and furrow surfaces and eventually clogs the normally permeable ridge area.

(3) A basin may be sited in an area where adequate natural wind is unavailable part or all of the year.

(4) A "high loading" basin may receive or generate relatively large quantities of organic or inorganic sediment. A basin may receive relatively high quantities of organic sediment in situations such as a municipal or industrial wastewater treatment facility water disposal/ percolation basin. In such a basin, the biological oxygen demand (BOD) may be relatively high due to entrained suspended or dissolved organic particles and/or other nutrients. The suspended particles become sediment and the dissolved organic particles and/or other nutrients become "food" for microbes and/or algae that eventually settle to the basin bottom as sediment. High levels of inorganic sediment can be generated when a basin is located in a relatively dusty area and soil or other inorganic material is blown into the basin forming clogging sediment. Another type of high loading basin is a flood control catchment basin. A flood control basin often receives runoff water containing high concentrations of street debris, including dirt (such as soil, sand, silt and clay) and organic material as is found in storm runoff water. These "high loading" conditions become problematic when the basin is not routinely or adequately dewatered and effectively wind washed.

(5) A basin may be situated where infiltration rates are relatively fast, such as 5 or 10 even 30 (vertical) feet per day. These relatively high infiltration rates normally require that the basin be dewatered and wave washed much more frequently than "normal" to prevent clogging of the ridge surface. The cost efficient operation of the basin may prevent or discourage routine wave washing of the ridges by fluctuating the water levels across the ridge surface.

(6) A basin might be constrained by relatively slow infiltration rates such as half and inch per day. This condition makes dewatering a relatively slow process.

(7) The basin volume may be relatively valuable, making it undesirable to reduce flows into the basin. Such conditions exist where basins are sited in developed areas and as infiltration demand increases, basin capacity becomes increasingly scarce and valuable. In these situations operators will often elect to spend "whatever it takes" to clean basins of clogging sediment in order to maximize basin infiltration. An example of this condition is where giant pool sweep-like machines are used to dredge the bottom of a basin located in highly developed areas. The basin bottom is cleaned while the basin is in operation. The dredging operation pumps the clogging sediment to the basin's surface and to a waste basin or somehow treats the dredged flow to separate the sediment (waste) from the water.

What is needed are new maintenance apparatuses that are adaptable for use in "ridge and furrow" basins that are particularly configured to improve permeability of the ridges for effective percolation rates through the ridges without the need to substantially reduce the fluid inflow into and fluid level of the basin. Preferably, such maintenance apparatuses should reduce the frequency of basin maintenance, the cost of that maintenance and the need to dispose of unwanted basin materials. In addition, the maintenance apparatuses should be cost effective, minimize the amount of labor necessary for basin maintenance, reduce the amount and frequency of basin downtime and substantially prevent the air dispersal of any basin contaminants.

SUMMARY OF THE INVENTION

The maintenance apparatuses for permeability improvement in fluid containment basins of the present invention provides the benefits and solves the problems identified above. That is to say, the present invention discloses apparatuses for maintaining a fluid containment basin that reduces the clogging effect of sediments found in basin influent and, thereby, reduces the need for basin maintenance. Use of the system of the present invention reduces the frequency and cost of typical basin maintenance, the amount of labor and materials needed for maintenance, the need to dispose of unwanted basin materials and the amount of time a basin must be taken out of operation for maintenance. The system of the present invention also reduces the likelihood that contaminants will be dispersed in the air. The apparatuses provide easy and cost effective mechanisms for improving fluid containment basin permeability. In addition, the apparatuses can be used for fluid containment systems that are configured to contain and percolate fluids other than water and which percolate those fluids through mediums other than soils.

In one embodiment of the present invention, the maintenance apparatuses for fluid containment basins comprises a tool support frame having a plurality of tubular members configured to substantially match the profile of the ridges, which are generally in the form of an inverted V-shape. The tool support frame is configured to be moved across the fluid containment basin generally above the ridges. A mechanism for raising and lowering the tool support frame on and off of the one or more ridges is used to allow mobility through the basin. In one configuration, the mechanism is a supply of compressed air that is in communication with the interior of the tubular members making up the tool support frame. Various valves can be used to control the flow of compressed air to the tool support frame. One or more ridge treating tools are supported by the tool support frame. Generally the tools are positioned below the frame. The ridge treating tools are configured to interact with the surfaces of the sides of the ridges to improve the permeability of the ridges to the fluid stored in the fluid containment basin. The tool support frame can have one or more airtight barriers to isolate sections of the frame to form at least two buoyancy chambers.

The one or more ridge treating tools can be selected from a group including dragging tools, discing tools and grinding tools, which can also be utilized in various combinations. The discing tool can have a disc frame with flexible axle having a plurality of disc blades attached thereto to allow the blades to substantially conform to the non-planar contour of the side of the ridges. One or more support members can be attached to the flexible axle and configured to allow the axle and the disc blades to move in response to the contour of the ridges. The grinding tool can have a grinding body with a plurality of outwardly extending teeth attached thereto. The tool support frame can be configured to be towed behind a conveyance device, such as a boat, having a mechanism for generating submerged wave energy, such as a motor-driven propellor. A deflector can be used to direct the submerged wave energy onto the one or more ridges and cause some of the sediment to become re-suspended in the fluid. In an alternative configuration, the apparatus for maintaining a fluid containment basin comprises just a conveyance device configured to move through the fluid containment basin and generate submerged wave energy onto the ridges. A deflector attached to the conveyance device helps direct the wave energy onto the ridges where the sediment is re-suspended in the fluid. As described above, the conveyance device can be a boat and the mechanism for generating wave energy can be the boat's motor-driven propellor. Directional stabilizing poles can be used to help keep the boat and treating tools aligned substantially above the top of the ridges.

Accordingly, the primary objective of the present invention is to provide maintenance apparatuses for permeability improvement fluid containment basins having the features generally described above and more specifically described below in the detailed description.

It is also an important objective of the present invention to provide maintenance apparatuses for fluid containment basins that utilize wave energy, gravitational forces and/or mechanical soil disturbance to promote permeable sloped surfaces (ridges) in the basin bottom through which fluid can percolate while keeping the basin in service.

It is also an important objective of the present invention to provide maintenance apparatuses for fluid containment basins that allow permeability maintenance to take place without having to drain or dry the basin, thereby allowing infiltration to continue virtually uninterrupted.

It is also an important objective of the present invention to provide a maintenance apparatus for fluid containment basins that is used with a motor boat or like device as it moves over the top of basin to direct fluid flow downward to improve the permeability of ridges located on the basin bottom.

It is also an important objective of the present invention to provide a maintenance apparatus for fluid containment basins that comprises a shaped frame component configured to have the ability to adjust its buoyancy and to carry one or more mechanical devices for cleaning the ridges on the basin bottom.

It is also an important objective of the present invention to provide maintenance apparatuses for fluid containment basins that are cost effective to make and use in fluid containment basins having a plurality of ridges and furrows located on the basin bottom.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

| REFERENCE NUMERALS IN DRAWINGS | |
|---|---|
| 10 | Maintenance Apparatus |
| 12 | Fluid containment basin |
| 14 | Basin embankment |
| 16 | Operational water level |
| 18 | Ridges |
| 20 | Furrows |
| 22 | Basin bottom |
| 24 | Fluid |
| 26 | Sides of ridges |
| 27 | Percolation through ridge |
| 28 | Compacted material (mat) |
| 30 | Thin sediment layer |
| 32 | Wind driven waves |
| 34 | Top of ridge |
| 36 | Propellor wash deflector |
| 38 | Boat |
| 40 | Boat motor |
| 42 | Propellor |
| 44 | Submerged wave energy |
| 46 | Propellor wash |
| 48 | Re-suspended sediment |
| 50 | First end of deflector |
| 52 | Second end of deflector |
| 54 | Directional stabilizing poles (whiskers) |
| 56 | Tensioning system |
| 58 | Connection to boat |
| 60 | Hinge point |
| 62 | Whisker contact point on ridge |
| 64 | Toe of slope |
| 70 | Tool support and buoyancy frame |
| 71 | Tubular frame members |
| 72 | Tether connectors on frame |
| 74 | Tethers |
| 75 | Tether connectors of boat |
| 76 | Compressed air source |
| 78 | Air hose |
| 80 | Air inlet valves |
| 84 | Holes |
| 86 | Air release valves |
| 88 | Airtight barriers |
| 89 | Chamber |
| 90 | Drag tool connecting links |
| 92 | Drag tool |
| 94 | Second drag tool |
| 96 | Teeth |
| 100 | Disc tool |
| 102 | Grinder tool |
| 104 | Hard crusty layer |
| 106 | Tool connecting bracket |
| 108 | Disc frame |
| 110 | Flexible axle |
| 112 | Disc blades |
| 114 | Flexible axle turnbuckle |
| 116 | Disc frame hinge point |
| 118 | Flexible axle tension spring |
| 120 | Flexible axle end bearing |

-continued

REFERENCE NUMERALS IN DRAWINGS

| | |
|---|---|
| 122 | Lateral restraints and vertical supports |
| 124 | Grinder frame |
| 126 | Grinder body |
| 128 | Grinder teeth |
| 130 | Grinder motor |
| 132 | Power conveyance system |
| 134 | Direction of frame movement |
| 136 | Loose crusty layer material |

DETAILED DESCRIPTION OF THE PREFERRED EMBODIMENTS

With reference to the figures where like elements have been given like numerical designations to facilitate the reader's understanding of the present invention, and particularly with reference to the embodiments of the present invention illustrated in FIGS. 1 through 10, the preferred embodiments of the present invention are set forth below. The enclosed figures and drawings are merely illustrative of the preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Preferred embodiments of the of the maintenance apparatuses of the present invention, identified generally as 10 in the figures, is configured for use with a fluid containment basin 12 having sloped basin embankments 14, an operational water level 16 and a plurality of ridges 18 and furrows 20 located on the basin bottom 22, as described in U.S. Pat. No. 6,709,199, (incorporated herein). As described in that patent application, sediment in the fluid 24, such as water, will generally settle on the ridges 18 and furrows 20. Gravitational forces will cause some of the material that settles on the sides 26 of ridges 18 to move to the basin bottom 22 in furrows 20, keeping the permeability of ridges 18 somewhat suitable for percolation 27 of fluid 24 through the basin bottom 22 to the groundwater located below. As the heavier materials settle in furrows 20, a mat 28 of settled sediment is somewhat uniformly distributed on the bottom 24 of basin 12. When the normal operational water level 16 is above the ridges 18, some of sediments in fluid 24 will settle on sides 24 of ridges 18 to form a thin layer of sediment 30 that will, over time, create a clogging layer that substantially impedes the percolation 27 of fluid 24 through ridges 18. In normal operation of fluid containment basin 12 for wave washing, the water level is lowered from the operational water level 16 to be adjacent the sides 26 of ridges 18 such that the wind driven waves, shown as 32 in FIG. 1, will substantially wash the thin layer of sediment 30 off of ridges 18, beginning with the top 34 of ridges 18. As the water level is furthered lowered the waves 32 will wash the lower portions of sides 26 of ridges 18. Once the ridges 18 are substantially washed clean of sediment, the water level is raised back to or near its operational water level 6 for normal operation of fluid containment basin 12, with the fluid 24 being able to percolate 27 through ridges 18 once again.

Although the wave washing technique described above and in U.S. Pat. No. 6,709,199, works well to maintain, improve and restore the permeability of a fluid containment basin 12 without the need for the use of heavy equipment the basin 12, some such configured basins have or are likely to experience limitations with wave washing (as set forth in the summary above). To facilitate the maintenance of fluid containment basins 12 having a plurality of ridges 18 and furrows 20 without the need to reduce fluid inflow into the basin 12, the apparatuses 10 of the present invention can be utilized to improve and/or restore permeability to the basin 12 for the percolation 27 of fluid 24 through the ridges 18.

Figure 1:
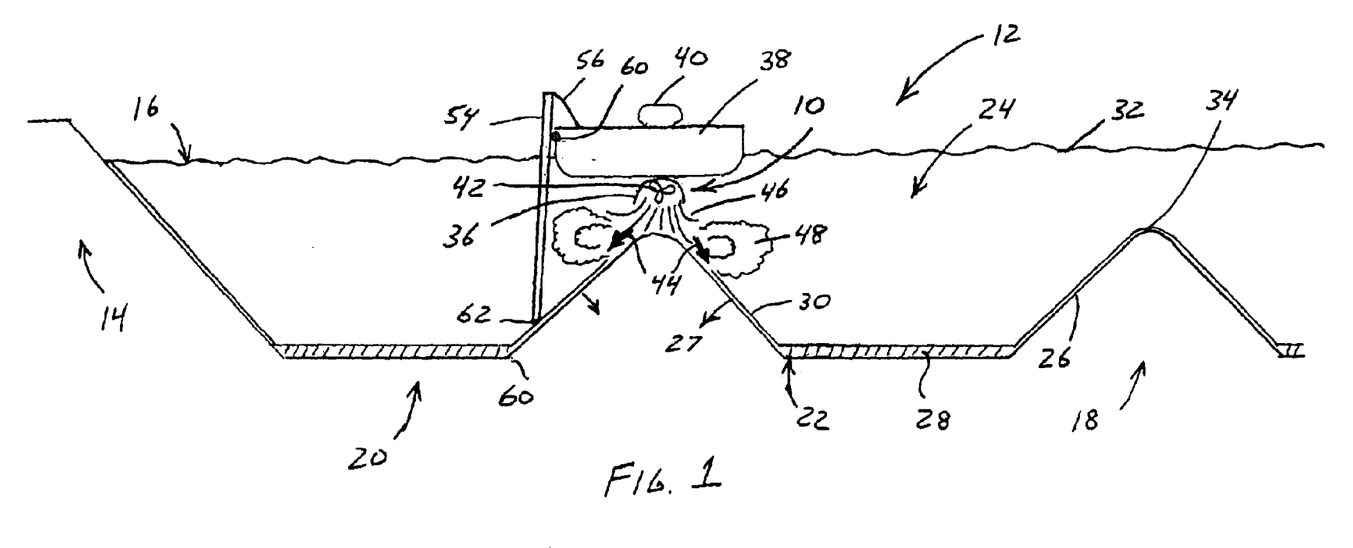
FIG. 1 is an end view of a fluid containment basin bottom having ridges and furrows showing use of a boat to generate submerged wave energy and a propeller wash deflector to direct the wave energy down onto the surface of the ridges to improve permeability thereof.
Figure 2:
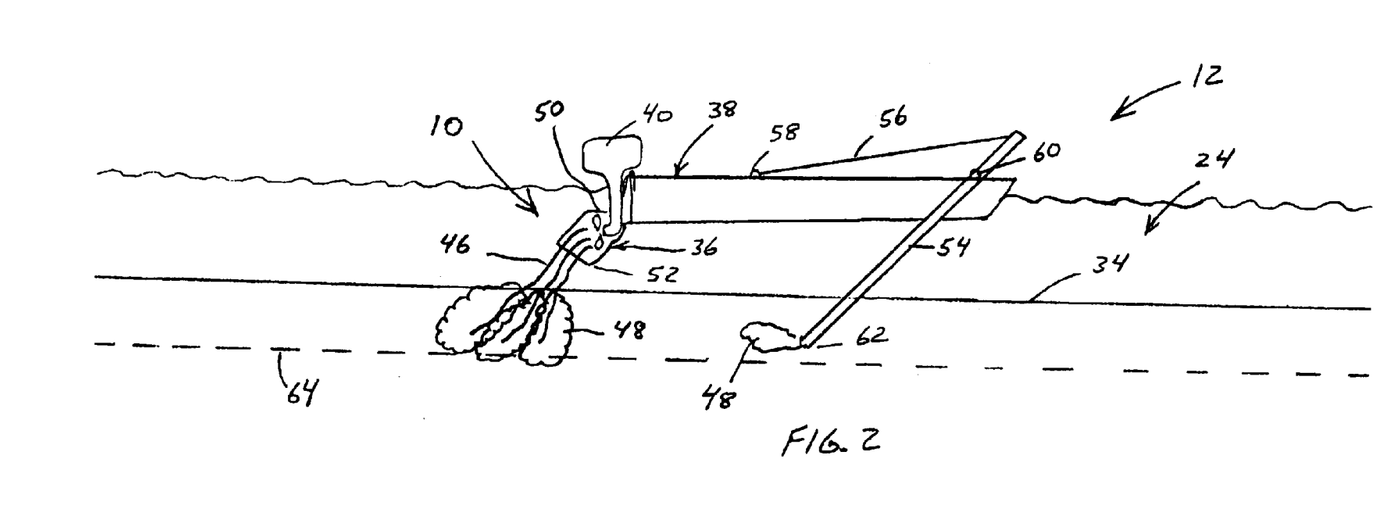
FIG. 2 is a side view of the fluid containment basin being maintained with the apparatus of the present invention shown in FIG. 1.
Figure 3:
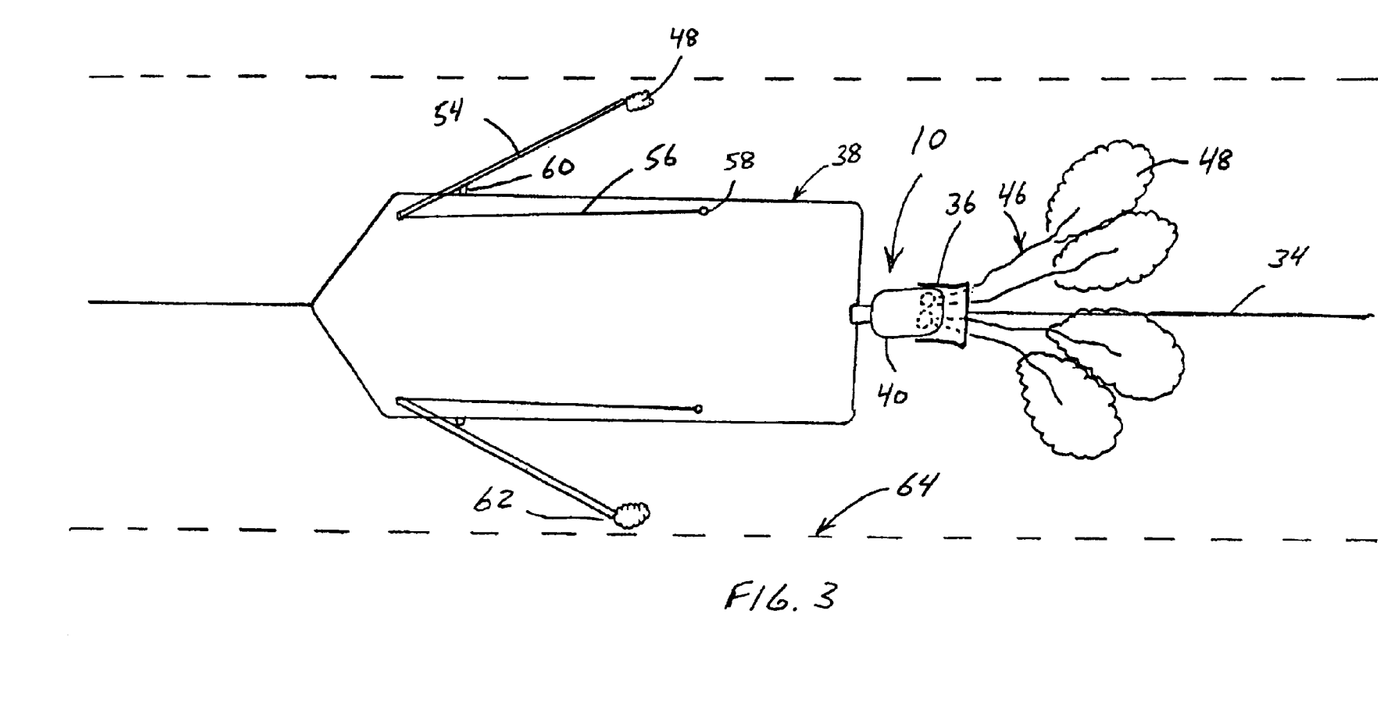
FIG. 3 is a top plan view of the fluid containment basin being maintained with the apparatus of the present invention shown in FIG. 1 with the use of two directional stabilizing poles.

The configuration of one such apparatus is shown in FIGS. 1 through 3. This particular apparatus is a propeller wash deflector 36 that is configured to be attached to a conveyance device that is driven, towed, pulled or pushed through the fluid containment basin 12, such as boat 38 having an outboard motor 40 with a propeller 42, either above, through or below the level of fluid 24 in basin 12. Boat 38, or other device, is used to generate submerged wave energy, shown as 44 in FIG. 1. In the embodiment where the device is boat 38, the submerged wave energy is generated from the propellor wash 46 from propellor 42 that is directed by propellor wash deflector 36 attached to motor 40 to re-suspend the sediments, shown as 48 in FIGS. 1 through 3, contained in the sediment layer 30 on sides 26 of ridges 18. The re-suspended sediment 48 will be directed to substantially re-settle in furrows 20 to accumulate in mat 28, thereby improving the permeability of ridges 18 for the percolation of fluid 24 through the basin bottom 22.

Propellor wash deflector 36 is shaped and configured to substantially envelope propellor 42 such that the force of water churned by propeller 42 during operation is directed substantially downward, as best shown in FIGS. 1 and 2. As shown in the figures, propeller wash deflector 36 can have a first end 50 attached to motor 40 just above propellor 42 and a second end 52 shaped to facilitate the direction of the propellor wash 46 toward the ridges 18 in basin 12. In one configuration, propellor wash deflector has a generally cone shape. If desired, propellor wash deflector 36 can be removably attached to motor 40. Although various materials are suitable for propellor wash deflector 36, such as metals, plastics, composites, fiberglass and others, the preferred material is substantially corrosion resistant and strong enough to resist damage from submerged wave energy 44.

Boat 38 can be configured with an operator who controls the movement of boat 38 above ridges 18 by steering the boat 38 in a conventional way. Alternatively, boat 38 can utilize one or more directional stabilizing poles 54, also know as whiskers, to aid in the directional control of boat 38 above ridges 18. FIGS. 1 and 2 show the use of a single whisker 54, whereas FIG. 3 shows the use of a pair of whiskers 54. On one configuration, whiskers 54 are configured to be buoyant so they will float alongside boat 38 when not in use. A tensioning system 56, comprised of a rope or cable attached to boat 38 at tension connection 58 and hinge point 60, is configured to lower whiskers 54 to contact side 26 of ridges 18 at contact point 62 just above the toe 64 of the slope of side 26. In use, the tensioned whiskers 54 contact the sides 26 of the ridges 18 to prevent boat 38 from substantially moving off the centerline of ridges 18 while moving forward across basin 12. The whiskers are raised by loosening tension system 56 to allow the buoyancy of each whisker 54 to raise it to the surface of fluid 24.

Figure 4:
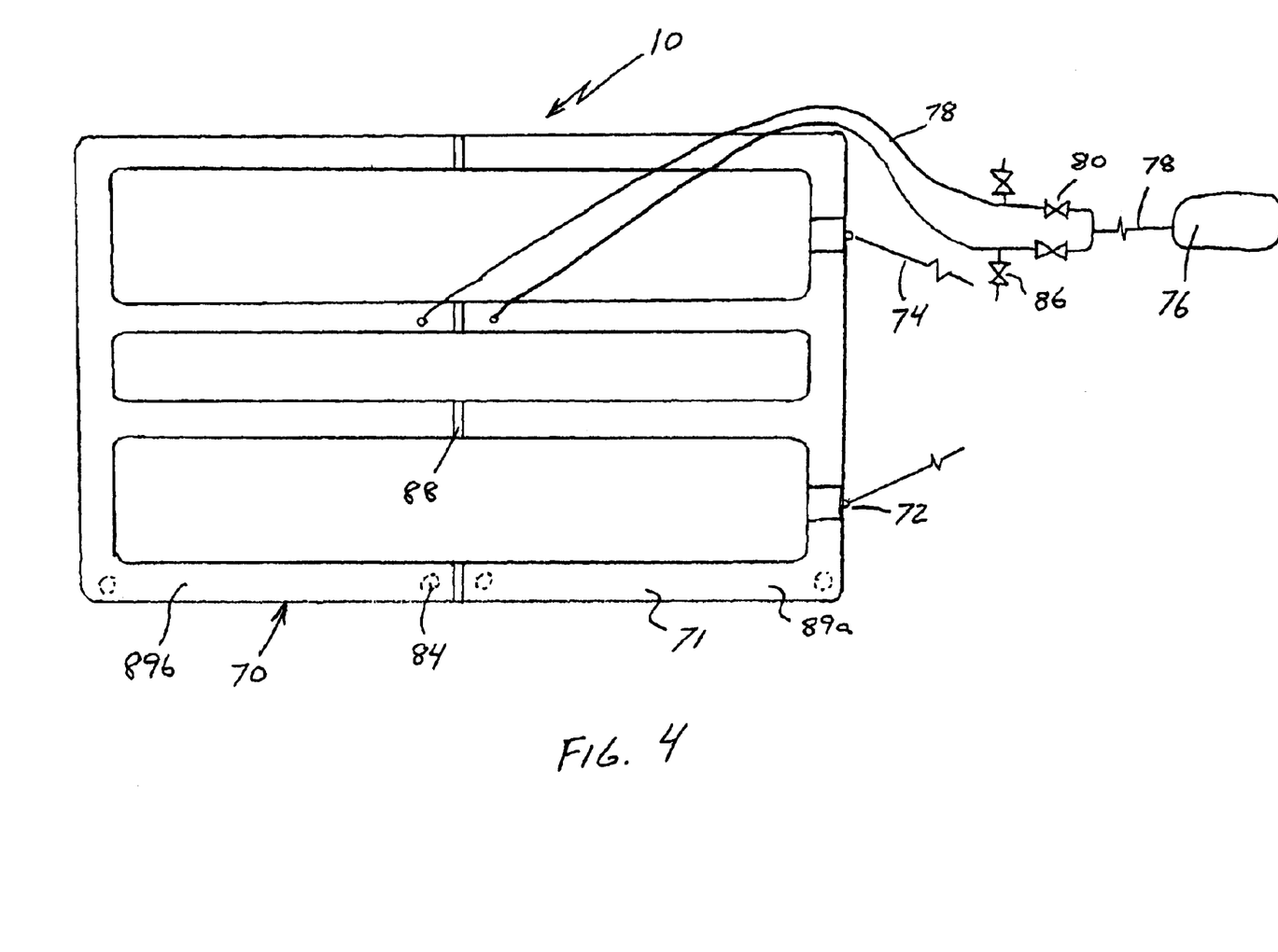
FIG. 4 is a top plan view of the tool support and buoyancy frame apparatus of the present invention for use in maintaining a fluid containment basin having one or more ridges therein.
Figure 5:
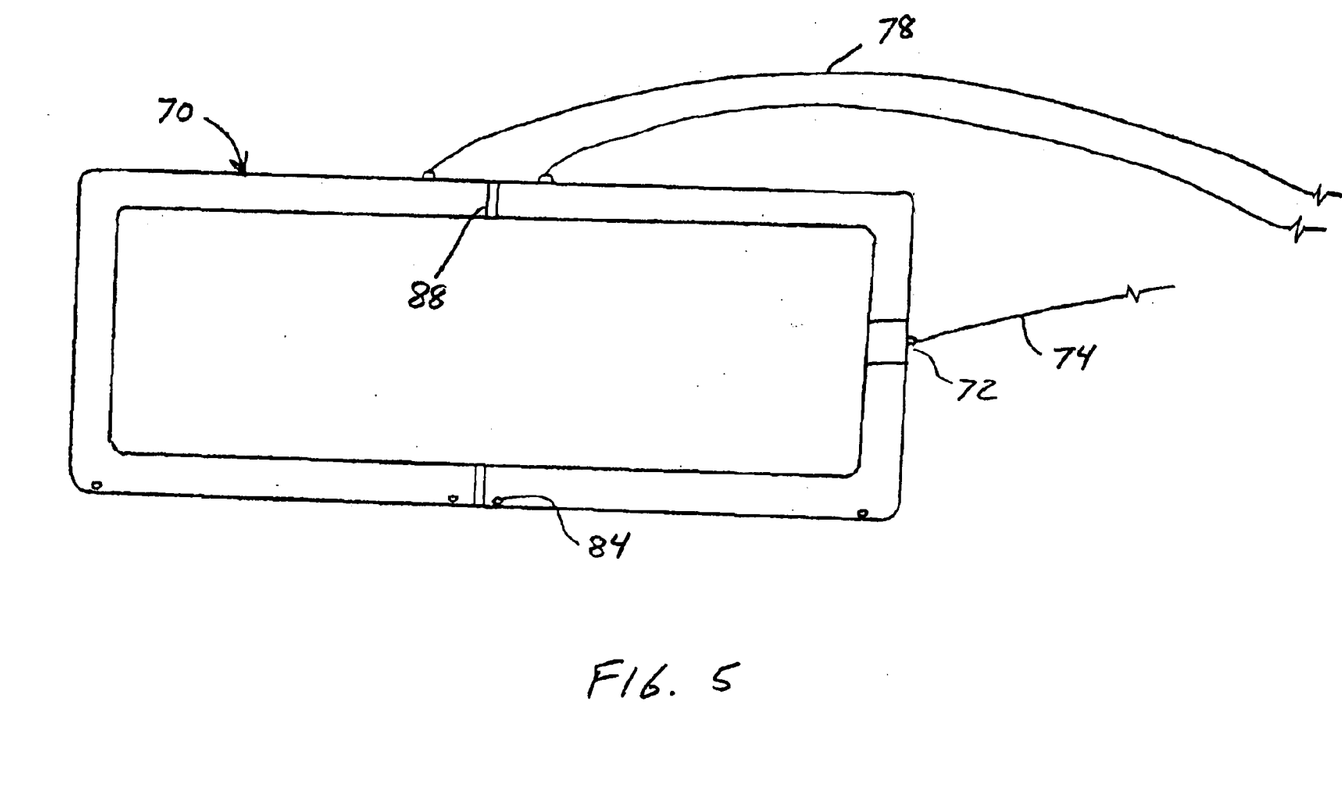
FIG. 5 is a side view of the tool support and buoyancy frame apparatus of the present invention shown in FIG. 4.
Figure 6:
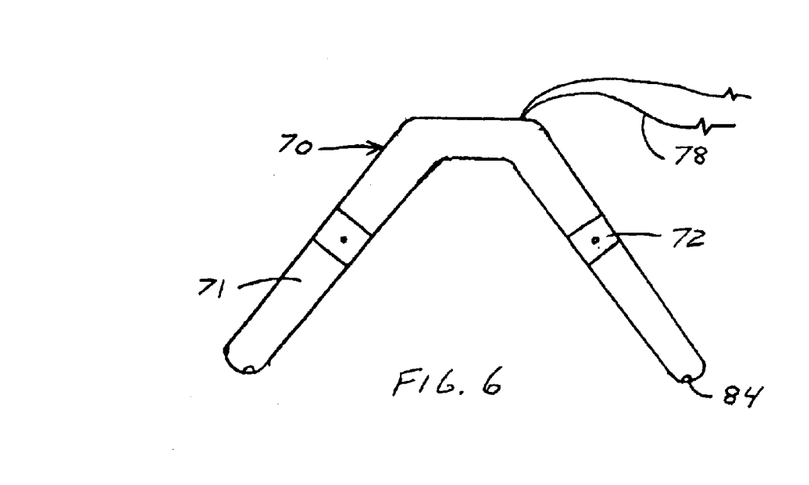
FIG. 6 is an end view of the tool support and buoyancy frame apparatus of the present invention shown in FIG. 4.

Another maintenance apparatus 10 for use in improving permeability of a fluid containment basin 12, configured as described above, is shown in FIGS. 4 through 10. In this configuration, apparatus 10 comprises a tool support and buoyancy frame 70, comprising a plurality of tubular frame members 71 in an inverted V-shape (i.e., with an interior profile similar to ridges 18), that is configured to support and carry a variety of ridge treating tools for disturbing the thin ridge surface sediment 30 on sides 26 of ridges 18 to re-suspend the sediment 48 and facilitate it settling in furrows 20 to accumulate in the settled sediment in mat 28. As best shown in FIGS. 4 and 5, frame 70 has one or more attachment points or tether connectors 72 for attachment to tethers 74 that connect frame 70 to the aft of boat 38 at tether connectors 75 (shown in FIG. 8) on boat 38. The frame 70 can be raised and lowered by allowing compressed air, from a compressed air source 76 via an air hoses 78 and air inlet 80, into the interior of frame 70, as best shown in FIG. 4. As the air enters hollow frame 70 it displaces the fluid 24 in the hollow frame 70 to cause it to exit frame 70 through the plurality of holes 84 near the lowest portions of frame 70. Adding air into frame 70 and displacing fluid 24 through holes 84 will make frame 70 more buoyant to raise frame 70 and the various ridge treating tools attached to it, as set forth in more detail below, off ridge 18 to allow boat 38, frame 70 and the tools to turn and move from one ridge 18 to another without the hindrance of dragging and disturbing the furrows 20. The propeller wash 46, together with gravity and underwater currents, move the re-suspended sediments 48 toward and into mat 28 in furrows 20. Boat 38 can be operated at various speeds and power settings to accomplish good re-suspension of the thin ridge surface sediment 30 on ridges 18. Air inlet valves 80 and air release valves 86 release air from the interior of frame 70 to allow frame 70 to be made more or less buoyant to adjust the drag force of the tools. Airtight barriers 88 can be utilized to allow one side or one end of frame 70 to be raised or lowered as needed to adjust for the configuration of ridges 18 and the amount of downward pressure (weight) desired.

Figure 7:
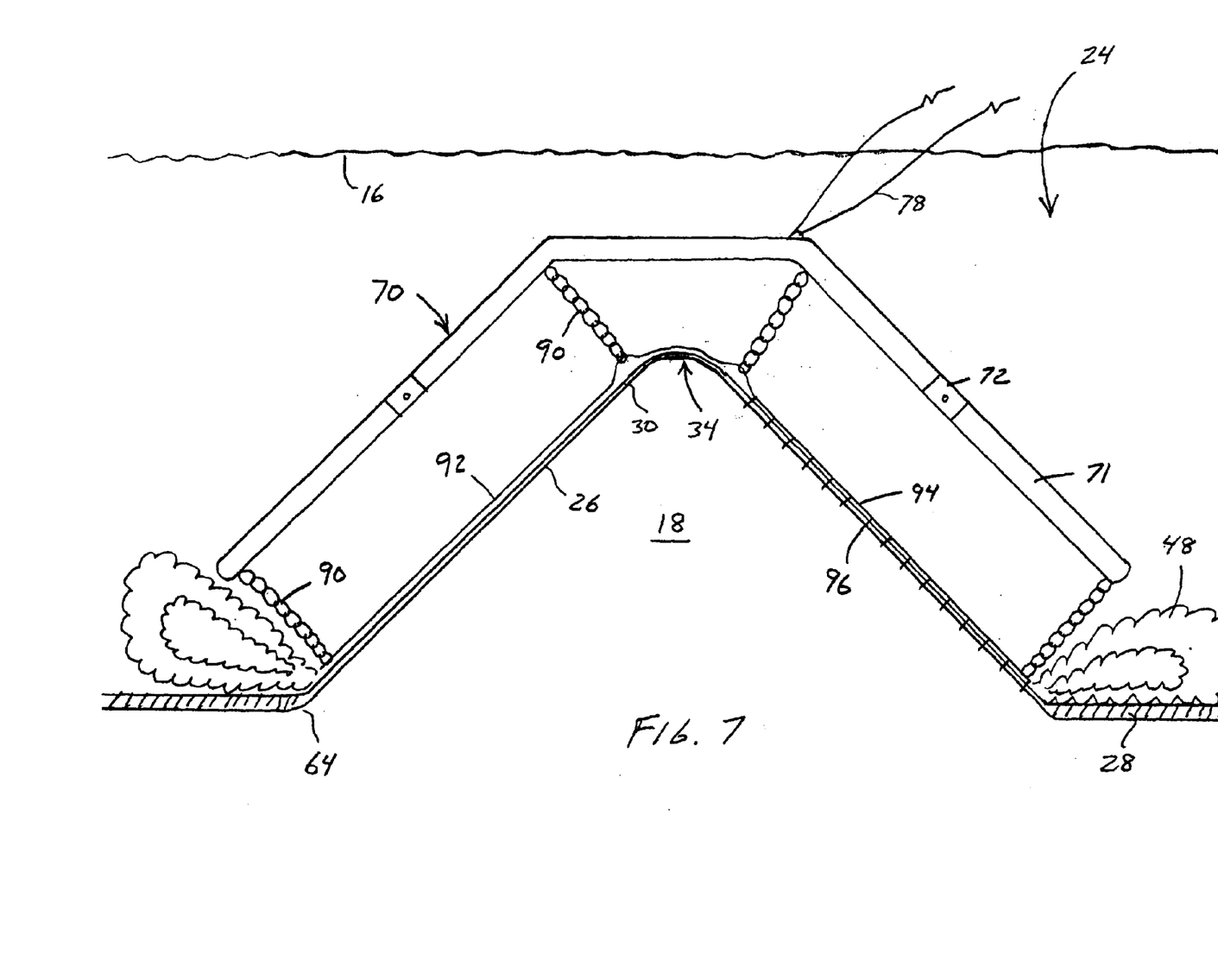
FIG. 7 is an end view of the tool support and buoyancy frame apparatus of the present invention shown in FIG. 4 utilizing two types of drag tools to clean ridges located on the bottom of a fluid containment basin.

As set forth above, various ridge treating tools can be utilized with frame 70, including dragging, discing and grinding tools. The dragging tools can be connected to frame 70 by way of connecting links 90, shown in FIGS. 7 and 8. Various drag tools can be used with frame 70 and they can be mixed together, such as shown in FIG. 7, to disturb the thin ridge surface sediment 30 on sides 26 of ridges 18 so as to cause the sediment 30 to become re-suspended and move into furrows 20. One such drag tool, shown as 92 in FIG. 7, can be configured similar to chain link material or expanded metal. A second drag tool, shown as 94 in FIG. 7, can also be configured similar to chain link material or expanded metal with a plurality of downward extending protrusions or teeth 96 that are configured to pass through, and more aggressively disturb, the thin ridge surface sediment 30 on sides 26 of ridges 18. Both drag tools 92 and 94 are configured to re-suspend the sediment material to facilitate it moving into furrows 20 and settling into mat 28. The use of the drag tool connecting links 90 allow the drag tools 92 and 94 to move across the side 26 of ridges 18 somewhat independent of frame 70. Drag tools 92 and 94 should be configured to be heavy enough to provide good contact with side 26 of ridge 18 and disturb the thin ridge surface sediment layer 30 on ridge 18. If desired, additional weight can be added to drag tools 92 and 94 to provide additional contact with ridge 18. As an example, additional weight can be achieved by attaching lengths of flexible metal chain or other weighted materials to the top side of drag tools 92 and 94. The propellor wash 46 directed from propellor 42 by propellor wash deflector 36 separates the fine sediment from the course grain material generally utilized for ridge 18. The fine sediment is re-suspended and the sands fall back onto the side 26 of ridge 18. The propellor wash 46, together with gravity and underwater currents, moves the re-suspended sediments 48 toward and into mat 28 at the bottom of furrows 20. As explained above, frame 70 can be more or less buoyant to adjust the drag force of tools 92 and 94 and boat 38 can be operated at various speeds and at various power settings to accomplish good suspension of the thin ridge surface sediment 30 on sides 26 of ridges 18.

Figure 8:
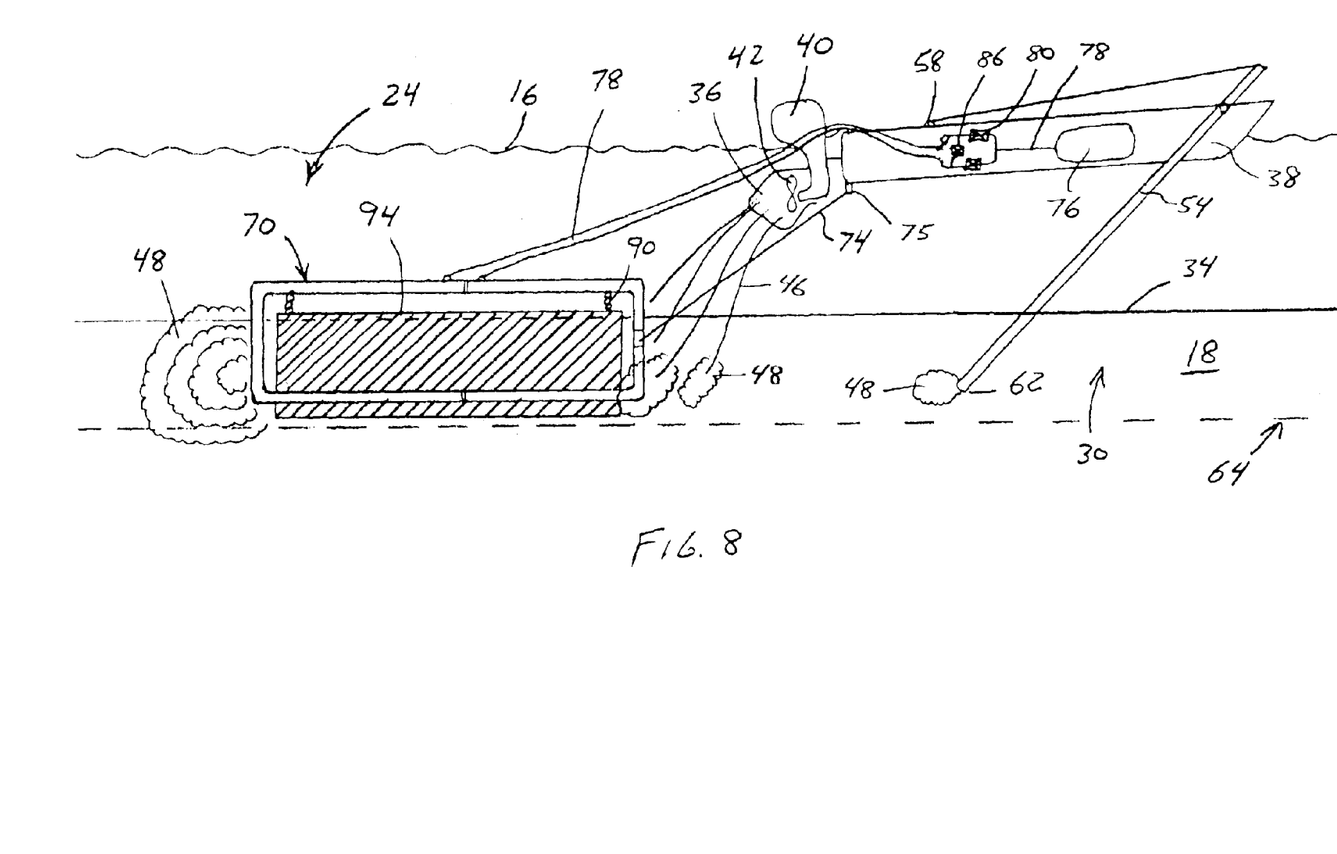
FIG. 8 is a side view of the tool support and buoyancy frame apparatus of the present invention shown being pulled by a boat utilizing a propeller wash deflector to re-suspend sediments accumulated on the surface of a ridge located on the bottom of a fluid containment basin.

As shown in FIG. 8, boat 38 having motor 40 with propellor 42 can pull, via tethers 78, the tool support and buoyancy frame 70 with drag tool 92 and/or drag tool 94. The drag tools 92 and 94 disturb the thin sediment layer 30 on side 26 of ridge 18 and the propellor wash 46, as directed downward by propellor wash deflector 36, create re-suspended sediments 48. FIG. 8 is a side or elevation view of drag tool 94 being dragged across the side 26 of ridge 18 on which is located the thin sediment layer 30. The drag tool 94, which could be drag tool 92 or similar dragging tools, are displacing the thin ridge surface sediment layer 30 and causing most of the sediment to become re-suspended sediment 48. The propellor wash 46 creates a significant underwater wave action that aids in re-suspending the thin ridge surface sediment 30 and moving the sediment toward and into furrow 20, where the re-suspended sediment 48 settles into mat 28 at the bottom of furrow 20. Tethers 74 attach frame 70 to boat 38 to allow frame 70, and the dragging tools 92 and 94 attached thereto by connecting links 90, to be moved along ridge 18. The whiskers 54 are held against the whisker point of contact 62 on ridge 18 by tensioning system 56, providing directional stabilization of boat 38, frame 70 and tools 92 and/or 94.

As explained above and shown in FIG. 4, frame 70 and the dragging tools 92 and/or 94 attached thereto are raised by allowing compressed air to travel from the compressed air source 76 through the air inlet valves 80 and air hoses 78 into the tubular frame members 71 of frame 70. The compressed air displaces fluid 24 out of frame 70 through the holes 84 for water inlet and outlet that are located at the lowest portions of frame 70. Frame 70 and the dragging tools 92 and/or 94 attached thereto are lowered by allowing compressed air to travel from frame 70 through the air hose 78 and air release valves 86 to the atmosphere. Fluid 24 displaces the compressed air by flowing into frame members 71 through holes 84. The forward and rearward buoyancy of frame 70 is controlled by providing at least two air hoses 78 attached to frame 70. As shown in FIGS. 4 and 5, frame 70 can utilize airtight barriers 88 to separate frame 70 into at least two buoyancy chambers 89a and 89b with each air hose 78 controlling one of the chambers. The configuration shown in FIGS. 4 and 5, utilize airtight barriers 88 located at approximately the midpoint between the front and rear of frame 70 to allow the front or rear portions of frame 70 to be made more or less buoyant than the other half of frame 70. Placing the air hose 78 connection to frame 70 at or near the top portion of frame 70 near its center helps keep the frame 70 in a generally upright configuration.

Figure 9:
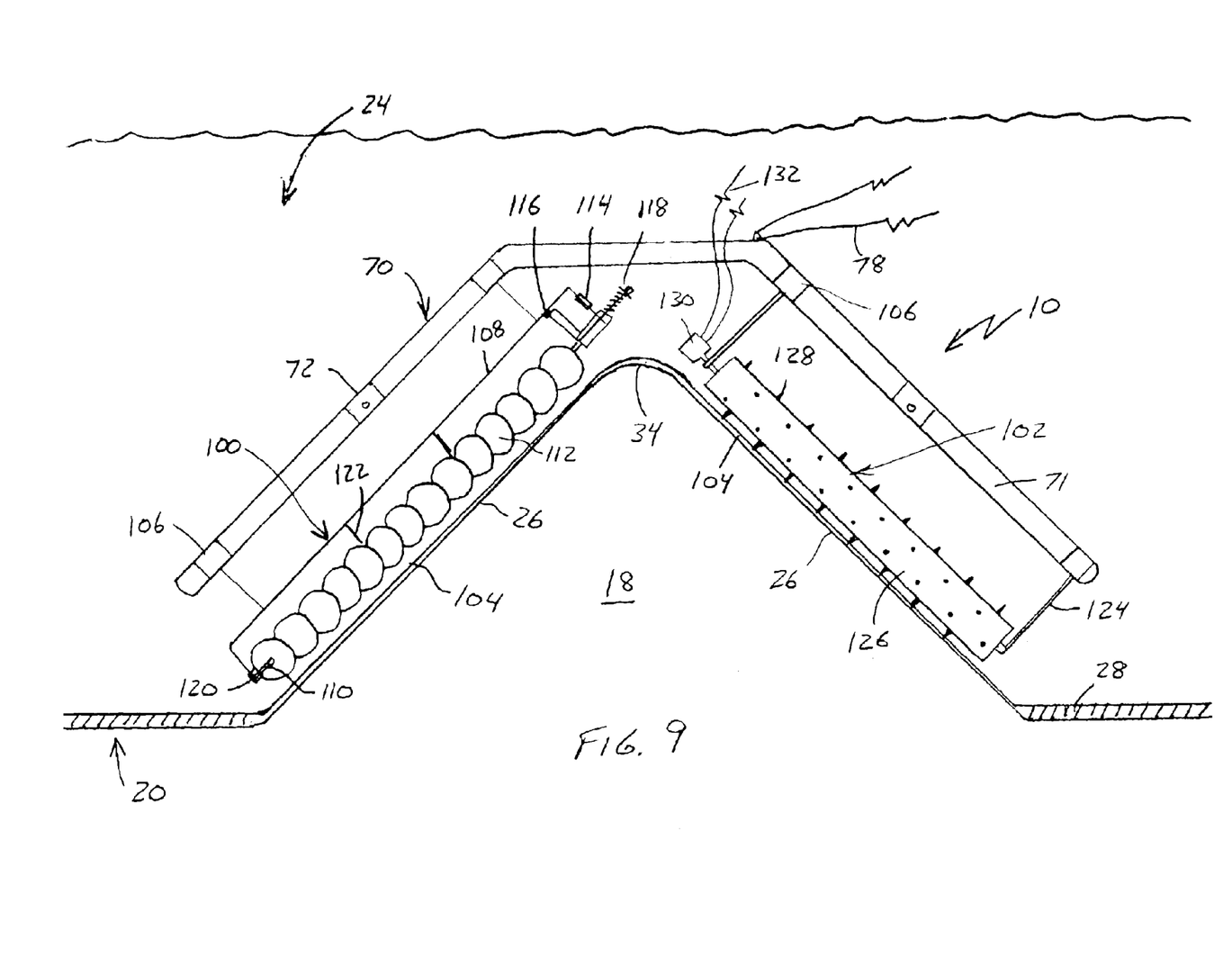
FIG. 9 is an end view of the tool support and buoyancy frame apparatus of the present invention shown in FIG. 4 utilizing two types of discing and grinding tools to clean ridges located on the bottom of a fluid containment basin.

As stated above, tool support and buoyancy frame 70 of the present invention can also be utilized to support and carry disc and grinding tools to mechanically treat sides 26 of ridges 18 to increase the permeability thereof. As shown in FIG. 9, frame 34 can support disc tool 100, shown on the left side of frame 70 and ridge 18, and grinder tool 102, shown on the right side of frame 70 and ridge 18. As with the dragging tools 92 and 94, disc tool 100 and grinder tool 102 are attached to frame 70 so as to interact with sides 26 when frame 70 is substantially centered over the top 34 of ridge 18. Typically, the same type of tool, e.g. disc tool 100 or grinder tool 102, will be used on both sides 26 of ridge 18 at the same time, depending on the need and the operator's discretion. Disc tool 100 and grinder tool 102 are used when the thin sediment layer 30 on sides 26 of ridge 18 become significantly compacted or hardened, such that it forms a hard crusty layer, shown as 104 in FIGS. 9 and 10, on the side 26 of ridge 18. Hard crusty layer 104 is likely to form where the basin 12 is deep enough to cause the fluid pressure at the bottom 22 of basin 12 to be sufficiently high to compress the thin ridge surface sediment layer 30 into a hard crusty layer 104. Disc tool 100 is used to cut through the hard crusty layer 104 and into the surface of side 26 of ridge 18 to more thoroughly expose the thin ridge surface sediment 30 to the action of the propellor wash 46 and to the gravitational and underwater current forces. Grinding tool 102 is used to more thoroughly cut and grind the hard crusty layer 104 on surface of side 26 and into ridge 18 when the crust has become particularly hard. Frame 70 has one or more tool-connecting brackets 106 to support the disc tool 100 and grinder tool 102.

Figure 10:
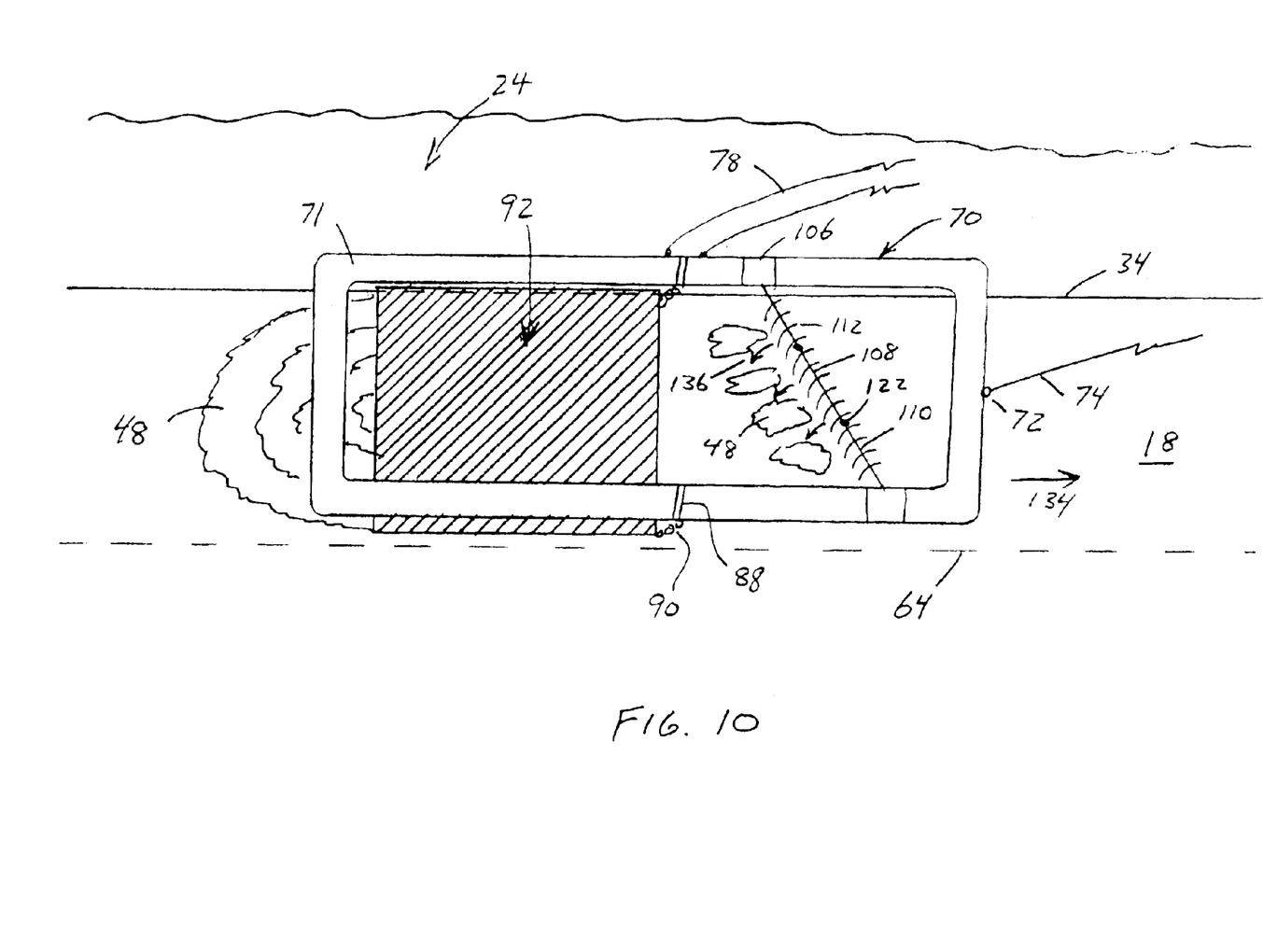
FIG. 10 is a side view of the tool support and buoyancy frame apparatus of the present invention shown with a combination of drag and discing tools mounted thereto.

As shown in FIGS. 9 and 10, disc tool 100 is constructed to have a disc frame 108 supporting a flexible axle 110 that allows the independently rotatable disc blades 112 to effectively contact the hard crusty layer 104 on the surface of sides 26 of ridges 18 even when the surface of ridge 18 is non-planar. As is known to those skilled in the art, the surface of sides 26 of ridges 18 often become more or less "rounded" over time. Generally, an axle that is rigid would not provide the required flexibility. Flexible axle 110, which can be a cable or cable-like member, is tensioned to disc frame 108 by at least one tensioning device, such as turn-buckle 114. In the embodiment shown in FIG. 9, one end of disc frame 108 is hinged at the disc frame hinge point 116 and a flexible axle turnbuckle 114 is used to provide preset adjustable tension. This embodiment also utilizes a flexible axle tension spring 118 that provides variable tension to flexible axle 110. Flexible axle 110 is connected to the disc frame 108 by a flexible axle end bearing 120. To provide lateral (i.e., to the rear of disc frame 108) and vertical support for the disc tool 100, lateral restraints and vertical support members 122 are utilized. These lateral restraints and vertical support members 122 allow flexible axle 110 and disc blades 112 to move vertically to conform to the non-planar and rounded shape of the side 26 of ridge 18. Lateral restraints and vertical supports 122 also provide some downward pressure to aid disc blades 112 in cutting through the hard crusty layer 104 on the ridge surface. As shown in FIG. 10, disc tool 100 can be attached to frame 70 such that it is in a non-perpendicular relationship with frame 70 to better facilitate operation of disc tool 100. In one configuration, disc frame 108 and/or disc blades 112 can be arranged such that as the disc blades 113 cut into ridge 18 the ridge material is pushed up the sides 26 to essentially "re-build" ridge 18.

Grinder tool 102 includes grinder frame 124 attached to and supported by tool and buoyancy frame 70 and a grinder body 126 having a plurality of grinder teeth 128 thereon for cutting into the hard crusty layer 104 on sides 26 of ridge 18. Grinder tool 102 can also be made flexible, without the concerns for the lateral support disc tool 100 requires. The rotating motion of grinder tool 102 may be powered by the friction between the side 26 of ridge 18 or by a grinder motor 130. If utilized, grinder motor 130 is connected to a power source by a power conveyance system, such as wires or hydraulic hoses 132. Disc tool 100 and grinder tool 102 will generally be configured to be sufficiently heavy enough to provide a good contact with side 26 of ridge 18 and cut through the hard crusty layer 104 and/or thin sediment layer 30 and into ridge 18 itself. In operation, grinding tool 102 will crush and pulverize the hard crusty layer 104 and thin sediment layer 30.

The tool support and buoyancy frame 70 shown in FIG. 10 has drag tool 92 and disc tool 100 atop a ridge 18 being pulled in the direction shown as 134. As shown in FIG. 10, disc tool 100 is cutting into the hard crusty layer 104 on side 26 of ridge 18 to move the loose crusty ridge material, shown as 136, downward, thereby breaking, disturbing and mixing material 136. Drag tool 92 is further disturbing the mixed material and the deflected propellor wash 46 is helping to create re-suspended sediments 48, which will migrate into furrows 20 and collect as additional mat 28. Those skilled in the art will recognize that disc tool 100 can be replaced by grinder tool 102 and/or drag tool 92 can be replaced with the second drag tool 94 having teeth 96.

Those skilled in the art will also recognize that the use of boat 38 is only descriptive of a preferred embodiment of the apparatus 10 of the present invention. Other embodiments may include the use of tensioning devices such as ropes or cables controlled at each end of basin 12 attached to an apparatus 10 and configured to move apparatus 10 across basin 12 so as to disturb the thin ridge surface sediment layer 30 and/or the hard crusty layer 104 on side 26 of ridge 18. Another embodiment may include a self-contained or remote controlled device used to move apparatuses 10 through basin 12 above ridges 18 to disturb the thin ridge surface sediment layer 30 and the hard crusty layer 104 on the surface of side 26 of ridge 18. The apparatus 10 used with these devices can include a mechanism for creating submerged wave energy 44, similar to that created by the deflection of propellor wash 46 by propellor wash deflector 36, or a device for moving tool support and buoyance frame 70, with drag tools 92 or 94, disc tools 100 and/or grinder tools 102 supported thereon, across basin 12 substantially centered over ridge 18.

While there are shown and described herein certain specific alternative forms of the invention, it will be readily apparent to those skilled in the art that the invention is not so limited, but is susceptible to various modifications and rearrangements in design and materials without departing from the spirit and scope of the invention. For instance, it should be noted that the present invention is subject to modification with regard to the dimensional relationships set forth herein and modifications in assembly, materials, size, shape and use. Accordingly, the scope of the invention should be determined not by the embodiments illustrated, but by the appended claims and their legal equivalents.

What is claimed is:

1. An apparatus for maintenance of a fluid containment basin configured for storing a fluid therein, said fluid containment basin enclosing a basin bottom having one or more ridges and one or more furrows, said apparatus comprising:

a tool support frame having a plurality of tubular members configured to substantially match the profile of said one or more ridges, said tool support frame configured to be moved across said fluid containment basin generally above said one or more ridges;

means connected to said tool support frame for raising and lowering said tool support frame on and off of said one or more ridges; and one or more ridge treating tools supported by said tool support frame, said one or more ridge treating tools configured to interact with the surfaces of said one or more ridges to improve the permeability of said one or more ridges to a fluid stored in said fluid containment basin.

2. The apparatus of claim 1, wherein said raising and lowering means comprises a source of compressed air in communication with the interior of said tool support frame to make said tool support frame more or less buoyant so as to raise and lower said tool support frame and adjust the interaction between said one or more ridge support tools and the surface of said one or more ridges.

3. The apparatus of claim 2, wherein said raising and lowering means comprises one or more control devices to control the flow of compressed air from said source of compressed air.

4. The apparatus of claim 1, wherein said tool support frame is configured in a generally inverted V-shape.

5. The apparatus of claim 1, wherein said tool support frame comprises one or more airtight barriers to isolate sections of said tool support frame and form at least two buoyancy chambers therein.

6. The apparatus of claim 1, wherein said one or more ridge treating tools are selected from a group including dragging tools, discing tools and grinding tools.

7. The apparatus of claim 6, wherein said one or more ridge treating tools includes a combination of at least one dragging tool and at least one discing or grinding tool.

8. The apparatus of claim 1, wherein said one or more ridge treating tools comprises a dragging tool configured to attach to said tool support frame with one or more connecting links and be dragged across the surface of said one or more ridges.

9. The apparatus of claim 8, wherein said dragging tool includes a plurality of downward extending protrusions.

10. The apparatus of claim 1, wherein said one or more ridge treating tools comprises a discing tool, said discing tool comprising a disc frame with an axle having a plurality of disc blades attached thereto.

11. The apparatus of claim 10, wherein said axle is flexible to allow said one or more ridge treating tools to substantially conform to the non-planar contour of the side of said one or more ridges.

12. The apparatus of claim 10, wherein said discing tool further comprises at least one tensioning device and one tension spring.

13. The apparatus of claim 10, wherein said discing tool further comprises one or more support members attached to said axle and configured to allow said axle and said disc blades to move in response to the contour of said ridges.

14. The apparatus of claim 10, wherein the interaction of said discing tool results in a quantity of material from said one or more ridges being deposited on said one or more ridges.

15. The apparatus of claim 1, wherein said one or more ridge treating tools comprises a grinding tool having a grinding body and a plurality of outwardly extending teeth attached to said grinding body.

16. The apparatus of claim 15, wherein said grinding tool further comprises a grinding motor.

17. The apparatus of claim 1, wherein said tool support frame is configured to be towed behind a conveyance device having means for generating submerged wave energy.

18. The apparatus of claim 17, wherein said conveyance device further comprises a deflector shaped and configured to direct said submerged wave energy onto said one or more ridges.

19. The apparatus of claim 17, wherein said conveyance device is a boat and said generating means is a propellor.

20. An apparatus for maintenance of a fluid containment basin configured for storing a fluid therein, said fluid containment basin enclosing a basin bottom having one or more ridges and one or more furrows, said apparatus comprising:

a tool support frame having a plurality of tubular members configured in a generally inverted V-shape, said tool support frame configured to be moved across said fluid containment basin generally above said one or more ridges;

a source of compressed air in communication with the interior of said tool support frame to make said tool support frame more or less buoyant so as to raise and lower said tool support frame and adjust the interaction between said one or more ridge support tools and said one or more ridges; and one or more ridge treating tools supported by said tool support frame generally below said tool support frame, said one or more ridge treating tools configured to interact with the surfaces of said one or more ridges to improve the permeability of said one or more ridges to a fluid stored in said fluid containment basin, said one or more ridge treating tools selected from a group including dragging tools, discing tools and grinding tools.

21. The apparatus of claim 20, wherein said tool support frame comprises one or more airtight barriers to isolate sections of said tool support frame and form at least two buoyancy chambers therein.

22. The apparatus of claim 20, wherein said one or more ridge treating tools includes a combination of at least one dragging tool and at least one discing or grinding tool.

23. The apparatus of claim 20, wherein said one or more ridge treating tools comprises a discing tool, said discing tool comprising a disc frame with a flexible axle having a plurality of disc blades attached thereto and one or more support members attached to said flexible axle and configured to allow said flexible axle and said disc blades to move in response to the contour of said one or more ridges.

24. The apparatus of claim 20, wherein said tool support frame is configured to be towed behind a conveyance device having means for generating submerged wave energy.

25. The apparatus of claim 24, wherein said conveyance device is a boat and said generating means is a propellor.

26. The apparatus of claim 24, wherein said conveyance device further comprises a deflector shaped and configured to direct said submerged wave energy onto said one or more ridges.

27. A method of maintaining a fluid containment basin to improve or restore the permeability of said fluid containment basin while storing a fluid therein, said fluid containment basin enclosing a basin bottom having one or more ridges and one or more furrows, said method comprising the steps of:

a. placing a tool support frame supporting one or more ridge cleaning tools substantially on said one or more ridges to cause said one or more ridge cleaning tools to interact with the surface of said one or more ridges, said tool support frame having a plurality of tubular members configured in a generally inverted V-shape; and b. moving said tool support frame with a conveyance device through said fluid containment basin substantially over said one or more ridges to cause said one or more ridge cleaning tools to disperse sediment from the one or more ridges into said fluid stored in said fluid containment basin.

28. The method of claim 27 further comprising the step of displacing submerged wave energy from said conveyance device while performing said moving step.

29. The method of claim 28, wherein said conveyance device is a boat having a propellor configured to perform said displacing step.

30. The method of claim 27, wherein the interior of said tool support frame is in communication with a source of compressed air so as to make said tool support frame more or less buoyant to raise and lower said tool support frame and adjust the interaction between said one or more ridge support tools and said one or more ridges.

31. The method of claim 27, wherein said one or more ridge treating tools are selected from a group including dragging tools, discing tools and grinding tools.

32. The method of claim 31, wherein said one or more ridge treating tools includes a combination of at least one dragging tool and at least one discing or grinding tool.

33. The method of claim 27, wherein said conveyance device comprises one or more ropes or cables attached to said tool support frame.

34. A method of maintaining a fluid containment basin to improve or restore the permeability of said fluid containment basin while storing a fluid therein, said fluid containment basin enclosing a basin bottom having one or more ridges and one or more furrows, said method comprising the steps of:

a. placing a tool support frame supporting one or more ridge cleaning tools substantially on said one or more ridges to cause said one or more ridge cleaning tools to interact with the surface of said one or more ridges, said tool support frame in communication with a source of compressed air so as to make said tool support frame more or less buoyant to raise and lower said tool support frame and adjust the interaction between said one or more ridge support tools and said one or more ridges; and    b. moving said tool support frame behind a conveyance device through said fluid containment basin substantially over said one or more ridges to cause said one or more ridge cleaning tools to disperse sediment from the one or more ridges into said fluid stored in said fluid containment basin.

35. The method of claim 34 further comprising the step of displacing submerged wave energy from said conveyance device while performing said moving step.

36. The method of claim 34, wherein said on or more ridge treating tools are selected from the group consisting of dragging tools, discing tools and grinding tools.

37. The method of claim 36, wherein said one or more ridge treating tools includes a combination of at least one dragging tool and at least one discing or grinding tool.

38. The method of claim 34, wherein said conveyance device comprises one or more ropes or cables attached to said tool support frame.

* * * * *